United States Patent [19]

Takegami et al.

[11] 4,400,328

[45] Aug. 23, 1983

[54] CRYSTALLINE ALUMINOSILICATE ZEOLITE CATALYST AND THE METHOD FOR MANUFACTURING THEREOF

[76] Inventors: Yoshinobu Takegami, 5 Shugakuin-Takabe-cho, Sakyo-ku, Kyoto; Tomoyuki Inui, 35-21 Koaza-Shodo, Oaza-Terada, Joyo; Takayuki Ishihara, 3 Shogoin-Nakamachi, Sakyo-ku, Kyoto; Eiichi Araki, 790-5 Kuchiri, Onoe-cho, Kakogawa; Toshihiro Kanie, 26-14 Oya-cho, Nishinomiya, all of Japan

[21] Appl. No.: 312,496

[22] Filed: Oct. 19, 1981

[51] Int. Cl.$^3$ .................................................. C07F 5/06
[52] U.S. Cl. .......................... 260/448 C; 252/431 N; 252/455 Z
[58] Field of Search ................ 260/448 C; 252/455 Z, 252/431 N

[56] References Cited

U.S. PATENT DOCUMENTS

| | | | |
|---|---|---|---|
| 3,849,463 | 11/1974 | Dwyer et al. | 260/448 C |
| 3,950,496 | 4/1976 | Ciric | 260/448 C |
| 4,016,245 | 4/1977 | Plank et al. | 260/448 C X |
| 4,086,186 | 4/1978 | Rubin et al. | 260/448 C X |
| 4,107,195 | 8/1978 | Rollman | 260/448 C |
| 4,175,114 | 11/1979 | Plank et al. | 260/448 C X |
| 4,205,053 | 5/1980 | Rollmann et al. | 260/448 C X |

*Primary Examiner*—Helen M. S. Sneed
*Attorney, Agent, or Firm*—Oldham, Oldham, Hudak, Weber & Sand Co.

[57] ABSTRACT

The present invention relates to provide new crystalline zeolite catalyst (ZKU-catalyst) having the superior catalytic activity and selectivity and the long period of the catalytic life.

One of the method of said catalyst (ZKU-2 catalyst) lies in crystallizing the starting zeolite preparation in the presence of the crystallization conditioning agent of crystallization of tetraalkyl (methyl or ethyl or combination thereof) ammonium cation.

Another method of said catalyst (ZKU-3, 4 catalysts) lies in crystallizing the starting zeolite preparation in the presence of both said conditioning agent of crystallization and the substance capable of forming the seed and/or the skelton of crystal. The ZKU-3 catalyst is manufactured using the seed of crystal, while the ZKU-4 catalyst is manufactured using the seed and the skelton of crystal.

The seed of crystal is useful for the promoter of the crystallization rate and the improvement of the catalytic activity, the skelton of crystal is useful for so-called "skelton" which is of use for the improvement of the mechanical strength, the dimentional stability and the conditioning of the pore structure of crystal in the molded catalyst and also for the improvement of uniformly dispersing the components of the catalytic composition.

The characteristic feature of the ZKU-2, 3 and 4 catalysts of the present invention has been compared with that of the ZSM-34 catalyst.

5 Claims, 12 Drawing Figures

CRYSTALLINE ALUMINOSILICATE ZEOLITE CATALYST AND THE METHOD FOR MANUFACTURING THEREOF

BACKGROUND OF THE INVENTION

The present invention relates to a new crystalline aluminosilicate zeolite catalyst (hereinafter referred to ZKU-catalyst) and the method for manufacturing thereof.

Especially, the present invention relates to the new crystalline alumino-silicate zeolite catalysts (hereinafter referred to ZKU-2, ZKU-3 and ZKU-4 catalysts).

The subject of synthesizing the low molecular olefin which is the main starting material of the petrochemical industry from the $C_1$-compound instead of the starting material of petroleum naphtha is going into the important problem. Particularly, it is demanded for developing the catalyst suitable to synthesizing ethylene and propylene etc. from methanol.

Recently, the zeolite catalyst of synthesizing the low molecular olefin from methanol has been developed (Japanese Patent Laid-Open No. 58,499/78). Said catalyst is called the ZSM-34 catalyst. However, there is many disadvantages of being necessary to use for the conditioning agent of crystallization in relatively great amount, the nitrogen-containing organic basic compound such as coline which has the strong bad smell and the high cost and also of requiring the long periods of the crystallization of 20–25 days. The catalyst manufactured according to the prior method has the short catalytic life and the low catalytic activity and the selectivity owing to the deposition of the carbonaceous material produced during the catalytic reaction.

The present invention is the new method of so-called "seed or nucleus crystallization method".

In comparison with the prior method, so-called "seed or nucleus crystallization method" of the present invention is the new method in which the zeolite crystal itself is used for the substance of promoting the crystallization of zeolite such as the substance forming the seed or the skelton of the zeolite crystal in the process of growing the zeolite crystal.

SUMMARY OF THE INVENTION

The object of the present invention relates to provide the new ZKU-catalyst having the superior catalytic activity and selectivity and the long period of the catalytic life and the method for manufacturing thereof improving the disadvantages as mentioned above.

In more detailed, the first object of the present invention relates to provide the new crystalline zeolite catalysts of ZKU-2, ZKU-3 and ZKU-4 catalysts.

The second object of the present invention relates to provide the new method of manufacturing the ZKU-2 catalyst using the conditioning agent of crystallization of tetraalkyl (methyl or ethyl or combination thereof) ammonium cation in the process of the crystallization of zeolite.

The third object of the present invention relates to provide the new method of manufacturing the ZKU-4 catalyst using the conditioning agent of crystallization of tetraalkyl (methyl or ethyl or combination thereof) ammonium cation and the substance of forming the seed of crystal in the process of growing the zeolite crystal.

The fourth object of the present invention relates to provide the new method of manufacturing the ZKU-3 catalyst using the conditioning agent of crystallization of tetraalkyl (methyl or ethyl or combination thereof) ammonium cation and the substance(s) of forming the seed of crystal and the skelton of crystal in the process of growing the zeolite crystal.

BRIEF DESCRIPTION OF THE DRAWINGS

In FIG. 1, the axis of ordinate indicates the relative strength, the abscissa indicates the diffraction angle ($2\theta°$).

DETAILED DESCRIPTION OF THE PREFERRED EMBODIMENTS

The new crystalline aluminosilicate zeolite catalyst (ZKU-catalyst) is represented by the following composition in the mole ratio of oxide $M_{2/n}O \cdot Al_2O_3 \cdot (8-70)SiO_2$ (wherein M represents cationic ion having the atomic valency n).

Figure 1:
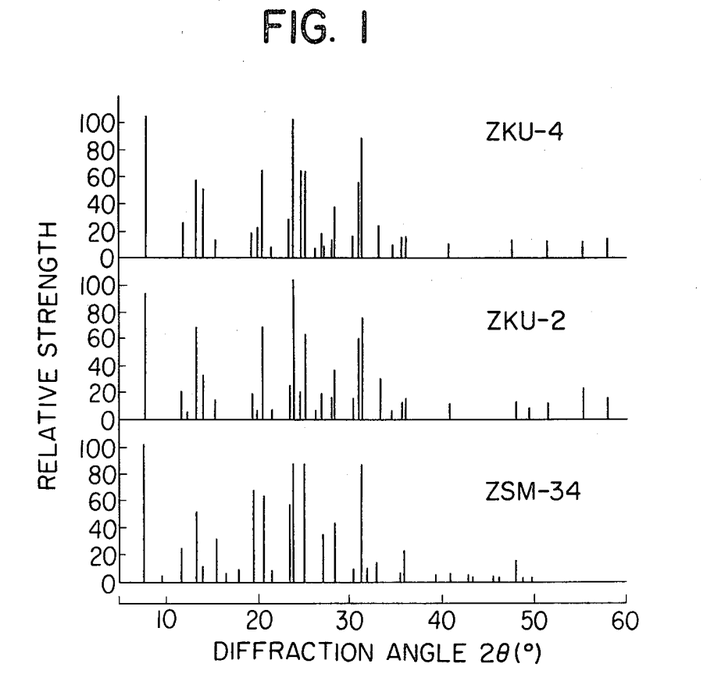
FIG. 1 is the X-ray diffraction diagrams of the ZKU-catalyst of the present invention and the ZSM-34 catalyst.
Figure 9:
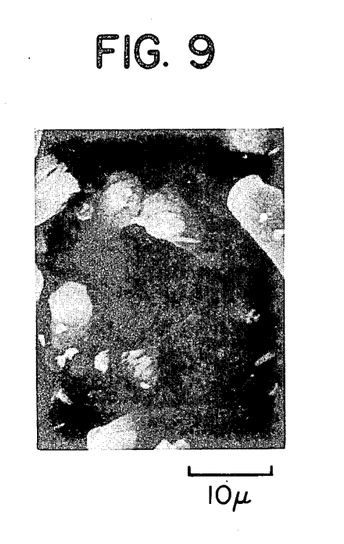
FIGS. 9 and 10 are the microscopic photographs of the ZKU-2 catalyst and the ZKU-4 catalyst (2,000 magnifications) respectively.
Figure 10:
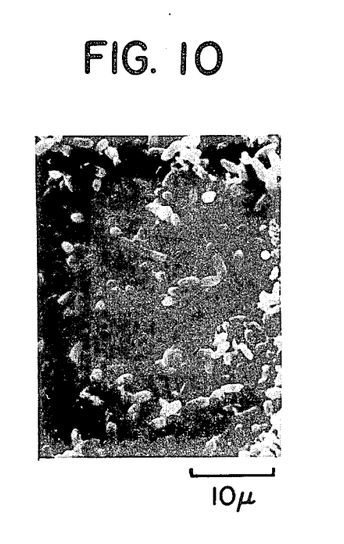

Said ZKU-catalyst has the X-ray diffraction pattern as shown in Table 1 and FIG. 1, and the crystalline form as shown in the electron microscopic photographys of FIGS. 9 and 10.

TABLE 1
X-RAY DIFFRACTION PATTERNS OF ZSM-34 CATALYST AND ZKU-CATALYST

| *2θ ZSM-34 | SPACE OF LATTICE FACE (Å) ZSM-34 | RELATIVE STRENGTH | *2θ ZKU-2 | SPACE OF LATTICE FACE (Å) ZKU-2 | RELATIVE STRENGTH | *2θ ZKU-4 | SPACE OF LATTICE FACE (Å) ZKU-4 | RELATIVE STRENGTH |
|---|---|---|---|---|---|---|---|---|
| 7.65 | 11.56 | 100 | 7.68 | 11.50 | 100 | 7.60 | 11.62 | 100 |
| 9.60 | 9.21 | 3 | 11.65 | 7.59 | 19 | 11.62 | 7.61 | 24 |
| 11.65 | 7.60 | 25 | 13.25 | 6.67 | 70 | 13.26 | 6.67 | 59 |
| 13.37 | 6.62 | 52 | 13.90 | 6.36 | 33 | 13.93 | 6.35 | 47 |
| 14.01 | 6.32 | 10 | 15.30 | 5.78 | 18 | 15.35 | 5.77 | 11 |
| 15.45 | 5.47 | 31 | 19.32 | 4.59 | 23 | 19.35 | 4.58 | 16 |
| 16.62 | 5.33 | 4 | 19.75 | 4.49 | 7 | 19.73 | 4.49 | 22 |
| 17.82 | 4.98 | 10 | 20.70 | 4.29 | 82 | 20.37 | 4.36 | 60 |
| 19.40 | 4.58 | 64 | 21.30 | 4.17 | 8 | 21.36 | 4.15 | 5 |
| 20.50 | 4.33 | 61 | 23.14 | 3.84 | 29 | 23.14 | 3.84 | 26 |
| 21.35 | 4.16 | 7 | 23.55 | 3.77 | 119 | 23.54 | 3.77 | 97 |
| 23.31 | 3.82 | 55 | 24.30 | 3.66 | 20 | 24.28 | 3.66 | 56 |
| 23.67 | 3.76 | 86 | 24.77 | 3.59 | 74 | 24.72 | 3.60 | 60 |
| 24.77 | 3.59 | 86 | 25.98 | 3.43 | 3 | 25.98 | 3.43 | 4 |
| 27.03 | 3.30 | 34 | 26.75 | 3.33 | 25 | 26.78 | 3.33 | 16 |
| 28.25 | 3.16 | 40 | 27.92 | 3.19 | 16 | 27.01 | 3.30 | 3 |
| 30.55 | 2.93 | 9 | 28.22 | 3.16 | 38 | 27.97 | 3.19 | 12 |
| 31.35 | 2.85 | 84 | 30.36 | 2.95 | 15 | 28.16 | 3.17 | 35 |
| 31.92 | 2.80 | 11 | 31.07 | 2.87 | 76 | 30.33 | 2.94 | 12 |
| 33.45 | 2.68 | 16 | 31.34 | 2.95 | 91 | 31.06 | 2.88 | 53 |
| 35.70 | 2.52 | 4 | 33.32 | 2.69 | 30 | 33.23 | 2.69 | 85 |
| 36.10 | 2.49 | 21 | 35.70 | 2.51 | 16 | 34.60 | 2.59 | 8 |
| 39.41 | 2.29 | 4 | 36.00 | 2.49 | 20 | 35.67 | 2.51 | 14 |
| 41.02 | 2.20 | 7 | 40.96 | 2.20 | 10 | 35.94 | 2.50 | 16 |
| 42.90 | 2.11 | 6 | 48.20 | 1.89 | 14 | 40.73 | 2.21 | 8 |
| 43.50 | 2.08 | 4 | 51.40 | 1.78 | 16 | 47.55 | 1.91 | 11 |
| 45.75 | 1.98 | 4 | 55.28 | 1.66 | 21 | 51.92 | 1.78 | 13 |
| 46.42 | 1.96 | 3 | 57.97 | 1.59 | 81 | 52.03 | 1.76 | 6 |
| 48.15 | 1.89 | 19 | | | | 55.32 | 1.66 | 13 |
| 48.83 | 1.87 | 5 | | | | 57.91 | 1.59 | 13 |
| 49.84 | 1.83 | 6 | | | | | | |

[NOTE] RIGAKU ELECTRIC (CO.) MANUFACTURED BY GEIGER-FLUX 2013 TYPE
*DIFFRACTION ANGLE

In the composition of ZKU-catalyst, the mole ratio of $SiO_2/Al_2O_3$ is 8–70; preferably 10–25, more preferably 10–23.

The ZKU-catalysts, likewise all zeolite catalyst, having various kinds of cationic ions represented by the symbol M in said composition such as alkali metal ion are present.

The representative composition [I] of the ZKU-catalyst of the present invention is shown by the mole ratio as follows:

| | |
|---|---|
| $SiO_2/Al_2O_3$ | 8–70 |
| $OH^-/SiO_2$ | 0.2–1.6 |
| $H_2O/SiO_2$ | 10–30 |
| $M/SiO_2$ | 0.2–1.7 |
| $R/SiO_2$ | 0.0086–0.20 |
| $R/M + R$ | 0.0005–0.40 |
| $K_2O/M_2O$ | 0.05–0.3 |

(wherein R represents tetraalkyl ammonium cation; alkyl radical is methyl, ethyl, or combination thereof; M is the alkaline metal ion as shown above).

One of the preferable composition [II] of the ZKU-catalyst of the present invention is shown by the mole ratio as follows:

| | |
|---|---|
| $SiO_2/Al_2O_3$ | 10–25 |
| $OH^-/SiO_2$ | 0.5–1.3 |
| $H_2O/SiO_2$ | 15–26 |
| $M/SiO_2$ | 0.55–1.4 |
| $R/SiO_2$ | 0.0096–0.16 |
| $R/M + R$ | 0.0060–0.22 |
| $K_2O/M_2O$ | 0.07–0.20 |

(wherein R represents tetraalkyl ammonium cation; alkyl radical is methyl, ethyl, or combination thereof; M is the same meaning as shown above).

Another preferable composition [III] of the ZKU-catalyst of the present invention is shown by the mole ratio as follows:

| | |
|---|---|
| $SiO_2/Al_2O_3$ | 15–23 |
| $OH^-/SiO_2$ | 0.54–0.96 |
| $H_2O/SiO_2$ | 16–20 |
| $M/SiO_2$ | 0.60–1.1 |
| $R/SiO_2$ | 0.013–0.015 |
| $R/M + R$ | 0.014–0.032 |
| $K_2O/M_2O$ | 0.12–0.17 |

(wherein R, M are same meaning as mentioned above).

Further preferable composition [IV] of the ZKU-catalyst of the present invention is shown by the mole ratio as follows:

| | |
|---|---|
| $SiO_2/Al_2O_3$ | 13–23 |
| $OH^-/SiO_2$ | 1.0–0.5 |
| $H_2O/SiO_2$ | 10–20 |
| $M/SiO_2$ | 0.5–1.5 |
| $R/SiO_2$ | 0.009–0.015 |
| $R/M + R$ | 0.0005–0.01 |
| $K_2O/M_2O$ | 0.1–0.2 |

(wherein R, M are same meaning as mentioned above).

(a) The first method for manufacturing the ZKU-catalyst of the present invention is the method for crystallizing the mixture (the starting zeolite preparation) consisting of sodium oxide, potassium oxide, silica, alumina, tetraalkyl ammonium compound and water and having the compositions [I]-[IV] as mentioned above (wherein M represents sodium or potassium ion) at the temperature of 150°-270° C., preferably 180°-210° C., for 0.5-20 hrs, preferably 1-2 hrs, and filtrating, washing and drying the obtained crystal and then calcining it at the temperature of 400°-600° C., preferably 450°-550° C., for 0.5-5 hrs, preferably 2-3 hrs.

(b) The 2nd method for manufacturing the ZKU-catalyst of the present invention is the method for adding and mixing the substance usable for the seed or the skelton of crystal or both of them to the mixture consisting of sodium oxide, potassium oxide, silica, alumina, tetraalkyl ammonium compound and water and having the compositions [I]-[IV] as mentioned above, and crystallizing the obtained mixture at the temperature of 150°-270° C., preferably 180°-250° C., for 0.5-20 hrs, preferably 2-10 hrs, and filtrating, washing and drying the obtained mixture and then calcining it at the temperature of 400°-600° C., preferably 450°-550° C., for 0.5-5 hrs, preferably 2-3 hrs.

α-alumina powders, kaoline powders, zeolite powders and various kinds of porcelain powders are used for the skelton of crystal. The crushed product of zeolite manufactured according to the method of the present invention, the crushed product of the natural or synthetic zeolite, γ-alumina powders, various kinds of clay powders which are calcined at the temperature of 500° C. are used for the seed of crystal.

The particle size of said skelton of crystal is the range of 0.5-10 microns, preferably 1-5 microns. The particle size of said seed of crystal is the range of 0.05-1 microns, preferably 0.1-0.3 microns. If the particle sizes of the skelton and the seed of crystal are outside of said range, the effects of adding the skelton and the seed of crystal are not fully disclosed. The additional amount of the substance usable for the skelton and/or the seed of crystal is satisfactory in the range of 0.45 to 20 wt%. The optimum additional amount is in the range of 2-15 wt%. When both the substances usable for forming the seed of crystal and that usable for the skelton of crystal are jointly used, the total amount of them may be within the range.

In the manufacture of the ZSM-34 catalyst, in order to reduce the duration(time) of crystallization, the conditioning agent of crystallization such as various kinds of the nitrogen-containing organic base comprising coline hydrochloride and tetraalkylamine has been used. The crystallization rate has the influence on the sorts of the conditioning agent of crystallization and the additional amount, in addition to the temperature of crystallization.

In the ZKU-catalyst of the present invention, the substance usable for the seed and/or the skelton of crystal is used in addition to the conditioning agent of crystallization such as tetramethyl ammonium hydroxide (TMAH) and/or tetraethyl ammonium hydroxide (TEAH). The seed of crystal is useful for the promoter of the crystallization rate and the improvement of the catalytic activity, while the skelton of crystal is useful for so-called "skelton" which is of use for the improvement of the mechanical strength, the dimentional stability and the conditioning of the pore structure of crystal, when the synthetic zeolite is used for the molded catalyst.

As explained hereinafter in detail in the item of the effect of the present invention, the crystallization rate (the crystallization day), the sorts of the conditioning agent of crystallization, the additional amount thereof, and the temperature of crystallization have the influence on the selectivity and the catalytic life of the obtained synthetic zeolite catalyst.

Figure 2:
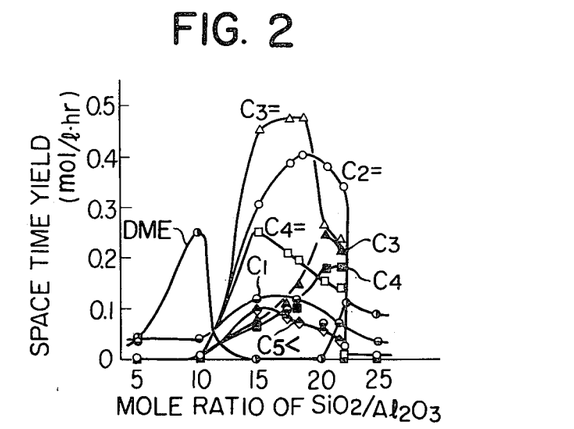
FIG. 2 is the graph of showing the interrelationship between the mole ratio of $SiO_2/Al_2O_3$ and the catalytic activity [space time yield (STY) (mol/l.hr)].

One of the preferable and practicable models of the catalyst of the present invention lies in the manufacture of ethylene and propylene from methanol and/or dimethylether with the substantially high selectivity. The component ratio of $SiO_2/Al_2O_3$ in the composition of the starting material in the manufacture of the zeolite catalyst has the influence on the catalytic activity and the crystalline structure of catalyst. The influence of the catalytic activity and the crystal structure on the various condition in the manufacture of the catalyst is explained as follows:

(A) The influence of the catalytic activity on the component ratio of $SiO_2/Al_2O_3$ The test result about the interrelationship between the component ratio of $SiO_2/Al_2O_3$ in the starting zeolite preparation and the catalytic selectivity in the selective synthetic reaction of low olefinic hydrocarbon from methanol (MeOH) is shown in FIG. 2.

From FIG. 2, when the mole ratio of $SiO_2/Al_2O_3$ is in the range of 15-23, dimethylether (DME) is not produced. The catalytic selectivity for producing olefin is high in said range, propylene is predominantly formed at the high ratio side of said range, while ethylene is predominantly formed at the low ratio side of said range. The present invention has the advantage capable of selectively synthesizing the desired olefin by changing the component ratio of $SiO_2/Al_2O_3$ in the catalyst of the present invention.

The catalyst was manufactured by crystallizing the starting zeolite preparation in the presence of the conditioning agent of tetramethyl ammonium hydroxide (TMAH) at the temperature of 187° C., 2 hrs. The synthetic reaction was carried out at the temperature of 400° C., in the space time velocity of 1,000 $hr^{-1}$ for few hrs-10 hrs, using the reaction gas of 12% of methanol and 88% of nitrogen. The gaseous product was analyzed according to the gas chromatography method.

In FIG. 2, symbols indicate the following meaning, namely DME: dimethylether, $C_1$: methane, $C_{2=}$: ethylene, $C_3$: propane, $C_{3=}$: propylene, $C_4$: butane, $C_{4=}$: butene, $C_5$: $C_5$-hydrocarbon, STY (mol/l.hr): space time yield.

(B) The influence of the selectivity on the crystallization rate

The test result about the interrelationship between the selectivity and the crystallization rate (hr, temp.) In the reaction of selectively synthesizing the low molecular olefin from methanol was shown in FIGS. 3 and 4. The reaction condition was the same one to that of the item (A).

Figure 3:
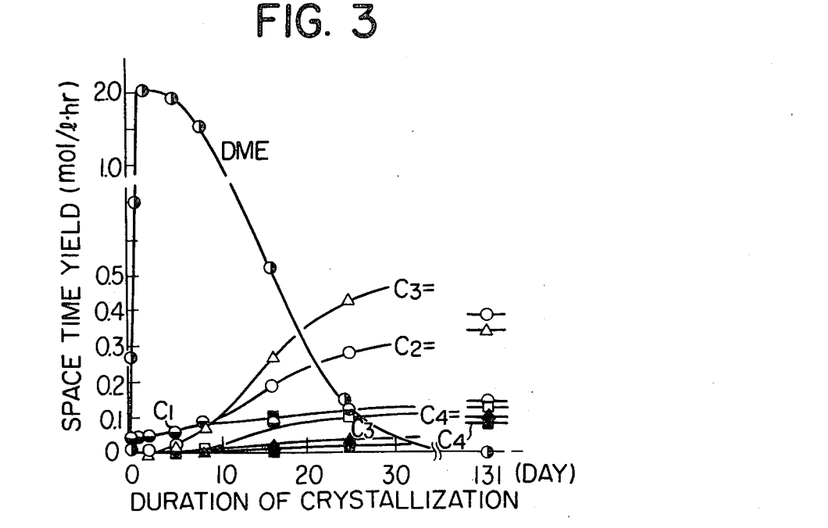
FIG. 3 is the graph of showing the interrelationship between the duration (day) of crystallization and the catalytic activity [STY (mol/l.hr)].

In FIG. 3, the zeolite catalyst (ZSM-34 catalyst) was manufactured by crystallizing at the temperature of 100° C., using the conditioning agent of crystallization of coline hydrochloride which was used under the same condition to that in the manufacture of the ZSM-35 catalyst. From FIG. 3, it was found that as the time necessary for the crystallization was lengthened, the formation of dimethylether (DME) disappeared and also that the period necessary for displaying the catalytic activity capable of forming hydrocarbon only was the long period of 30 days.

Figure 4:
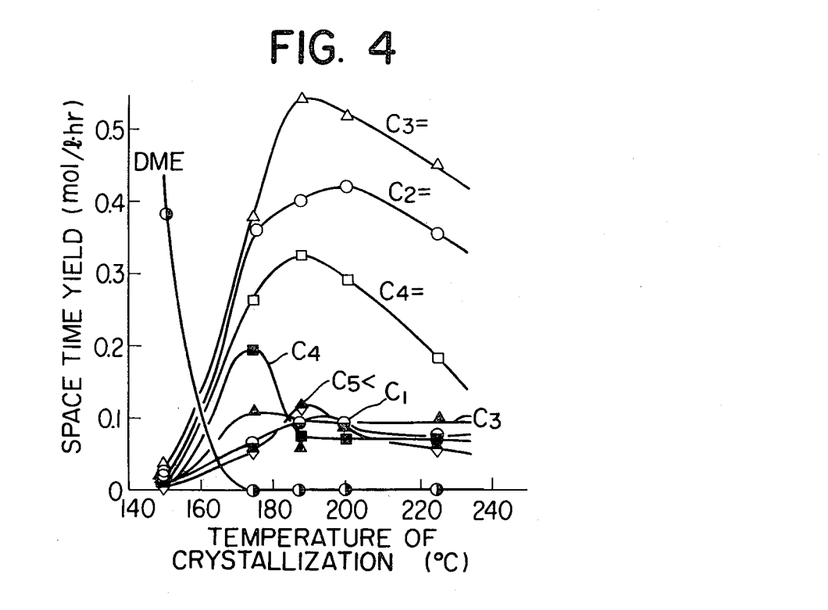
FIG. 4 is the graph of showing the interrelationship between the temperature (°C.) of crystallization and the catalytic activity [STY (mol/l.hr)].

FIG. 4 showed the test result about the ZKU-catalyst using the conditioning agent of crystallization of tetramethyl ammonium hydroxide (TMAH) and crystallizing for 2 hrs at the various temperatures. From FIG. 4, is was found that the catalytic activity about the formation of DME disappeared and that the formation of hydrocarbon was only displayed.

From FIG. 4, the temperature of the crystallization of the ZKU-catalyst of the present invention was determined to be in the range of 150°–250° 1 C., preferably 100°–210° C. under the condition of crystallization in which the mole ratio of tetramethyl ammonium hydroxide to alkaline is 1/15, and the crystallization is carried out for 2 hrs at the various temperatures.

Table 2 showed the test result about the manufacture of the ZKU-catalyst of the present invention under the condition in which the crystallization is carried out at the temperature of 200° C. varying the crystallization time of 2, 6 and 10 hrs respectively.

TABLE 2
INFLUENCE OF CATALYTIC ACTIVITY ON CRYSTALLIZATION TIME

| CRYS-TAL-LIZA-TION TIME (hr) | PRODUCT (mol %) | | | | | | | |
|---|---|---|---|---|---|---|---|---|
| | $C_1$ | $C_2=$ | $C_3$ | $C_3=$ | $C_4$ | $C_4=$ | $C_5<$ | DME |
| 2 | 6.05 | 28.4 | 6.43 | 29.5 | 4.38 | 19.8 | 5.51 | 0.0 |
| 6 | 5.02 | 24.3 | 5.71 | 36.7 | 4.50 | 17.6 | 5.90 | 0.0 |
| 10 | 6.31 | 29.4 | 10.1 | 30.4 | 6.60 | 13.0 | 4.24 | 0.0 |

From Table 2, it was found that the time of the crystallization was enough to 2 hrs and that the formation of $C_3$ and $C_4$ paraffin hydrocarbons intended to increase in the case of the crystallization time of 10 hrs. From Table 2, the crystallization period was determined to be 0.5–10 hrs, preferably 1–2 hrs. The test result shown in Table 2 was obtained under the reaction condition of selectively synthesizing the low molecular olefin from methanol in which the starting gas comprising the partial pressure of methanol of 0.15 atm. and that of nitrogen of 0.85 atm. was used at the temperatures of 400° C. and the space time velocity of 900 hr$^{-1}$. The conversion rate of methanol was 100%.

Similar result was obtained using the conditioning agent of crystallization of tetraethyl ammonium hydroxide instead of tetramethyl ammonium hydroxide. When tetraproply ammonium hydroxide and tetrabutyl ammonium hydroxide were used, the formation of olefin was remarkable decreased, while the formation of DME and methane was only observed. So that, in the present invention, it was determined to use tetramethyl ammonium hydroxide and tetraethyl ammonium hydroxide as the conditioning agent of crystallization.

(C) The influence of the catalytic selectivity on tetramethyl ammonium hydroxide (TMAH)

Figure 5:
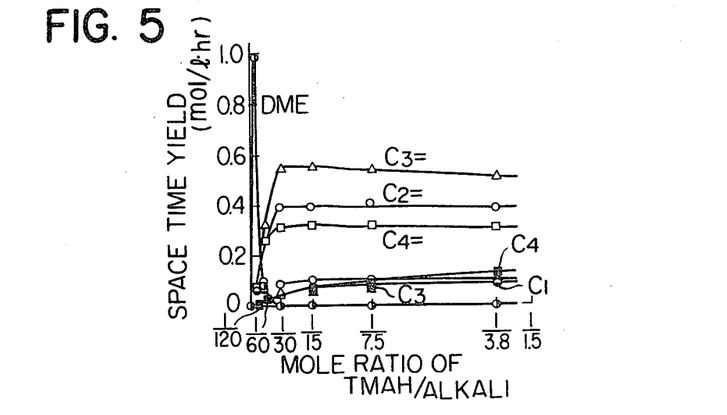
FIG. 5 is the graph of showing the interrelationship between the mole ratio of TMAH/alkaline and the catalytic activity [STY (mol/l.hr)].

The test result about the ZKU-catalyst of the interrelationship between the mole ratio of alkali and the additional amount of TMAH in the selective synthesizing reaction of the low molecular olefin from methanol was shown in FIG. 5.

As shown in FIG. 5, the catalytic activity of the formation of DME was displayed in the case of said ratio of 1/120. Said activity was suddenly decreased in the case of said ratio of 1/60, while the catalytic activity of forming hydrocarbon was displayed. The catalytic selectivity (mol %) was shown by 25.0% of ethylene, 32.7% of propylene and 19.2% of butene on the mole basis. The crystallization was carried out at the temperature of 187° C. for 2 hrs. The selective synthetic reaction condition in which the low molecular olefin is obtained from methanol was the same one to that of the item (A).

From FIG. 5, the ratio of R/M+R in the ZKU-catalyst of the present invention was determined to be in the range of 0.0005–0.4 in the case of the broad range, 0.006–0.22 in the preferable range, and 0.014–0.032 in the most preferable range respectively. In order to obtain the same catalytic selectivity to that of the ZKU-catalyst in the case of said ratio of 1/30, said ratio of the ZSM-34 catalyst was 1/3.8. The difference between the ZKU-catalyst and the ZSM-34 catalyst lies in the point that the ratio of R/M+R in the former is remarkably small in comparison with that of the latter. This is one of the characteristic feature of the ZKU catalyst.

(D) The influence of the catalytic life on the seed or the skelton of crystal

The test was carried out to examine the interrelationship between the additional amount of the seed and the skelton of crystal and the catalytic life in the selective synthetic reaction of low molecular olefin from methanol. The test result about the ZKU-3 catalyst using the skelton and the seed of crystal (α-alumina) was shown in FIG. 6, while the test result about the ZKU-4 catalyst using the seed of crystal was shown in FIG. 7. The catalytic life was shown by the integrated amount of hydrocarbon formed, until the formation of DME begins.

Figure 6:
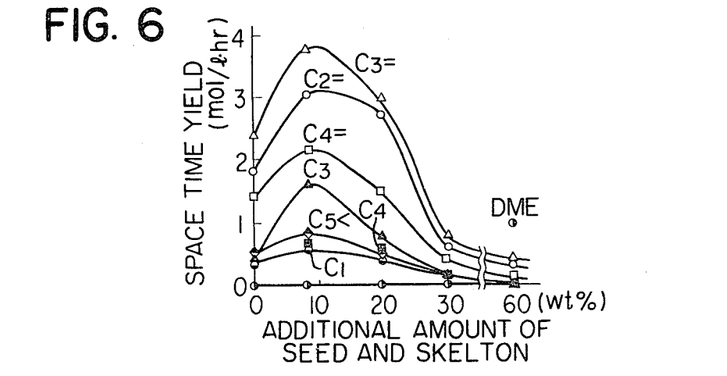
FIG. 6 is the graph of showing the interrelationship between the additional amount of the skelton and the seed (wt%) and the integrated amount of the product (mol/l.hr) until the beginning of depressing the catalytic activity.
Figure 7:
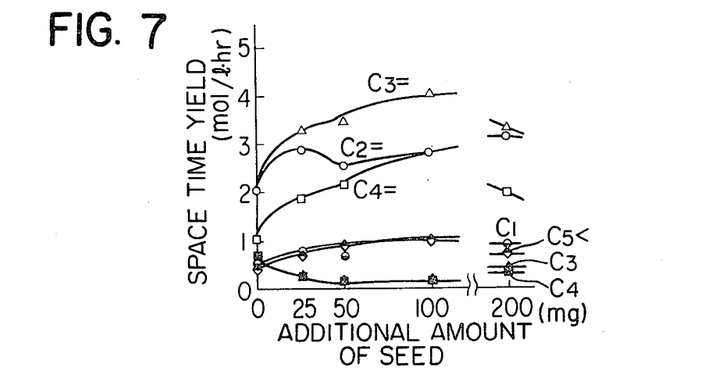
FIG. 7 is the graph of showing the interrelationship betwee the additional amount (mg) of the seed of crystal per 1.1 g of the formed crystal and the integrated amount of the produce (mol/l.hr) until the beginning of depressing the catalytic activity.

From FIGS. 6 and 7, it was found that the additional amount of the seed and/or the skelton of crystal was enough to 0.45–20 wt% and that the optimum additional amount was 2–15 wt%. When both the speed and the skelton are used, total additional amount of both of them were necessary to be within said range. Said reaction was carried out using the starting gas comprising 12% of methanol and 88% of nitrogen at the temperature of 400° C. and the space velocity of 940 hr$^{-1}$. The product gas was analyzed according to the gas chromatography.

The obtained crystalline product was separated from the mother liquid by filterating and washing, drying and calcining at the temperature of 400°–600° C., preferably 450°–550° C., for 0.5–5 hrs, preferably 2–3 hrs.

(E) Specific character of ZKU-catalyst of the present invention

The X-ray diffraction diagrams of the ZKU-catalyst of the present invention and that of the ZSM-34 catalyst are shown in FIG. 1 and the relative strength thereof is shown in Table 1 respectively.

From FIG. 1, it was found that the ZKU-catalyst of the present invention was in advance of the crystallization in comparison with the ZSM-35 catalyst, not-withstanding the short crystallization period. The crystallization of the ZKU-catalyst (ZKU-2, 3, 4) was carried out at the temperature of 187° C. for 2 hrs in the presence of the conditioning agent of crystallization of TMAH, while the crystallization of the ZKU-34 catalyst was carried out at the temperature of 98.9° C. for 25 days in the presence of the conditioning agent of crystallization of coline hydrochloride. The X-ray diffraction of the crystal was carried out according to Geiger-Flux 2013 type apparatus manufactured by RIGAKU ELECTRIC CO., (Tokyo).

Figure 8:
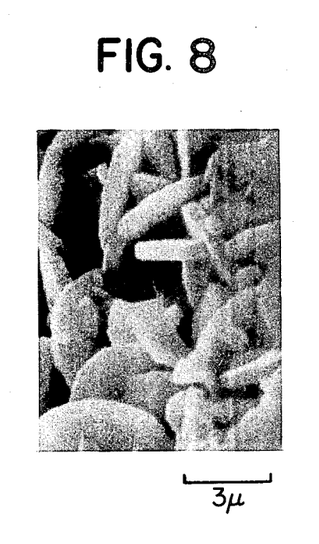
FIG. 8 is the microscopic photograph of the ZSM-34 catalyst (7,000 magnifications).

FIG. 8 showed the electron microscopic photograph of the ZSM-34 catalyst (magnification 7,000), FIG. 9 showed the electron microscopic photograph of the ZKU-2 catalyst of the present invention (magnification 2,000, Example 1, without adding any seed of crystal), FIG. 10 showed the electron microscopic photograph of the ZKU-4 catalyst of the present invention (magnification 2,000, Example 3).

In FIG. 8, the ZSM-34 catalyst showed the orbicualr and fairly irregular crystal form.

In FIG. 9, the ZKU-2 catalyst showed the orbicualr and fairly regular crystal form.

In FIG. 10, the ZKU-4 catalyst showed the rice grain like and regular crystal form and the size (volume) of crystal was found to be about 1/130 in comparison with that of the ZKU-2 catalyst.

From FIGS. 3 to 10, it was found that the ZKU-catalyst was fairly different from the ZSM-34 catalyst in the crystal form.

The effect of the present invention is shown as follows:

(1) The catalytic life of ZKU-catalyst of the present invention

The catalytic life of the ZKU-catalyst has been examined in the selective synthesizing reaction in which the low molecular olefin is synthesized from methanol. As clearly disclosed in Table 9, Example 27, Laid-Open No. 58,499/74 specification, in the ZSM-34 catalyst, the formation of DME was found after the lapse of 2 hrs from the beginning of the use of catalyst, and remarkably increased after the lapse of 5.5 hrs. While the formation of olefin was remarkably decreased. From said matters, it was found that the catalytic life of the ZSM-34 catalyst was very short and that the selectivity for forming olefin was inferior.

Table 3 showed the comparison of the catalytic selectivity between the ZKU-catalyst and the ZSM-34 catalyst.

TABLE 3

COMPARISON OF CATALYTIC SELECTIVITY BETWEEN ZKU-CATALYSTS AND ZSM-34 CATALYST

| CATALYST (mol/l) | $C_1$ | $C_{2=}$ | $C_3$ | $C_{3=}$ | $C_4$ | $C_{4=}$ | $C_5<$ | $\Sigma HC$ (mol/l) |
|---|---|---|---|---|---|---|---|---|
| ZSM-34 | 21.3 | 32.5 | 9.9 | 20.5 | 4.9 | 11.0 | 0 | 6.16 |
| ZKU-2 | 7.1 | 27.9 | 7.3 | 31.4 | 5.1 | 15.6 | 5.6 | 5.51 |
| ZKU-3 | 4.4 | 23.9 | 12.7 | 29.9 | 5.4 | 17.1 | 6.7 | 12.55 |
| ZKU-4 | 7.9 | 23.5 | 1.1 | 34.2 | 1.1 | 23.6 | 8.6 | 11.97 |

In Table 3, symbols $C_1$, $C_{2=}$, $C_3$, $C_{3=}$, $C_4$, $C_{4=}$, $C_5$ are same meaning to those of Table 2, $\Sigma HC$ means the integrated amount (mol/l) of the total hydrocarbons formed during the period of from the beginning of reaction to the formation of dimethylether (DME). $\Sigma HC$ is the measure of indicating the catalytic life. It has the meaning that the more the value shown by the symbol "$\Sigma HC$" becomes large, the more the catalytic life becomes long. The reaction condition is the same to that of Table 2.

Figure 11:
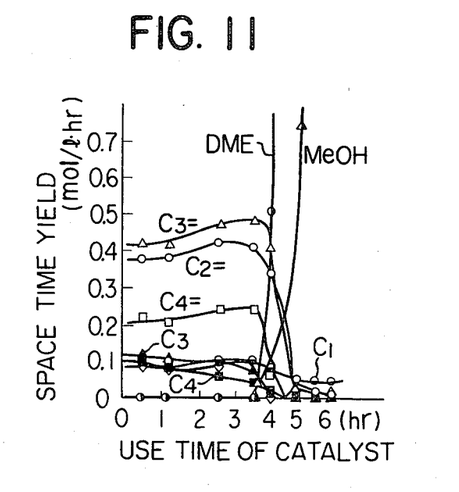
FIG. 11 is the graph of showing the interrelationship between the activity change of the ZKU-2 catalyst [STY (mol/l.hr)] and the laspe of use time (hr).

From Table 3, it was found that the catalytic life of the ZKU-3 and ZKU-4 catalysts were about twice times in comparison with that of the ZSM-34 and ZKU-2 catalysts respectively. As clearly shown in FIG. 11, the catalytic activity about the formation of olefin in the ZKU-2 catalyst was found to be maintained to the same extent to that of the ZSM-34 catalyst after the lapse of 4 hrs from the beginning of the use of catalyst and also the formation of DME was found to suddenly occur. From said matter, it was found that the ZKU-catalyst was longer than the ZSM-34 catalyst in the catalytic life.

Figure 12:
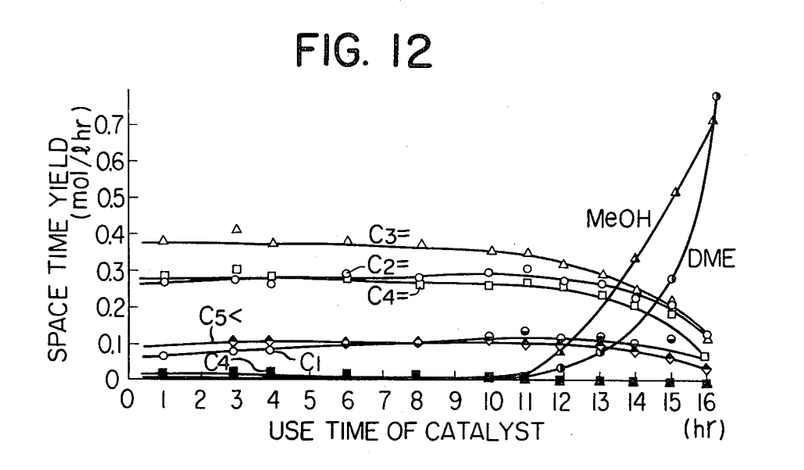
FIG. 12 is the graph of showing the interrelationship between the catalytic activity [STY (mol/l.hr)] of the ZKU-catalyst and the use time (hr) of catalyst.

FIG. 12 showed the catalytic life of the ZKU-4 catalyst which was manufactured adding about 10 wt% of the seed of catalyst. As clearly shown in FIG. 12, it was found that in the ZKU-4 catalyst, the formation of DME commenced after the lapse of 11 hrs from the beginning of the use of catalyst and that the period until the beginning of the formation of DME was longer than that of the ZKU-2 catalyst.

From FIGS. 7 and 12, the addition of the seed of catalyst was found to be effective in the extension of the catalytic life. The reaction condition about the selective synthesis of low molecular olefin from methanol was the space time velocity of 940 $hr^{-1}$ and the temperature of 400° C. using the starting gas consisting 12% of methanol and 88% of nitrogen. The product gas was analyzed by means of the gas chromatography.

(2) The selectivity of the ZKU-catalyst of the present invention

The interrelationship between the catalytic composition ($SiO_2/Al_2O_3$ ratio) and the catalytic selectivity was examined in the selective synthetic reaction of producing the low molecular olefin from methanol. It was found from FIG. 2 that the formation of DME was not observed in the molar range of $SiO_2/Al_2O_3$ of about 13–23, and that the selectivity of olefin was high and also that the formation of propylene was predominant at the low ratio side of said range, while the formation of ethylene was predominant at the high ratio side of said range.

Table 3 showed the catalytic selectivity between the ZSM-34 catalyst and the ZKU-catalyst in said reaction.

From Table 3, it was found that the methane formation of the ZKU-catalyst was less than that of the ZSM-34 catalyst and that the selectivity of olefin was higher than that of the ZSM-34 catalyst.

From FIGS. 6 and 7, the ZKU-3 and 4 catalysts manufactured adding the seed and the skelton of catalyst in the crystallization of zeolite were found to be superior to the ZKU-2 catalyst in the selectivity of olefin respectively.

In Table 3, the selectivity of olefin in the ZKU-4 catalyst was high, and the total amount of $C_{2=}$, $C_{3=}$ and $C_{4=}$ hydrocarbons amounted to 81.3%.

Especially, from FIG. 6, the amount of hydrocarbon produced until the deterioration of catalyst manufactured by adding the seed and the skelton of catalyst in the crystallization of zeolite amounted to the maximum value.

The invention will now be illustrated by the following examples.

EXAMPLE 1

The mixture having the following composition in the molar ratio, namely

| | |
|---|---|
| $SiO_2/Al_2O_3$ | 18.5 |
| $OH^-/SiO_2$ | 0.63 |
| $H_2O/OH^-$ | 32.3 |
| $R^+/R^+ + M^+$ | 0.053 |

| -continued | |
|---|---|
| (M = Na + K) | R = TMAH |
| K$_2$O/M$_2$O | 0.195 | was maintained at the temperature of 187° C., for 2 hrs, after crystallization, the obtained crystalline was separated from the mother liquor by the decantation, washed, dried at the temperature of 110° C., 2 hrs and calcined at the temperature of 540° C. for 3 hrs in the air stream to manufacture the catalyst (ZKU-2).

EXAMPLE 2

The mixture having the catalytic composition as shown in Example 1 was crystallized under the same condition to that of Example 1 adding about 10 wt% of the mixture of the skelton and the seed of crystal consisting of α-alumina and γ-alumina in the weight ratio of 3:1. The obtained crystal was separated from the mother liquor by the decantation, washed, and dried at the temperature of 110° C. for 2 hrs and calcined at the temperature of 540° C. for 3 hrs to manufacture the catalyst (ZKU-3).

EXAMPLE 3

The mixture having the catalytic composition as shown in Example 1 was crystallized under the same condition to that of Example 1 adding about 10 wt% of the seed of crystal which was manufactured according to the process of Example 1 to manufacture the catalyst (ZKU-4).

The catalytic feature of the ZKU-catalyst of the present invention is shown as follows:

(1) The crystallizing period is able to be shortened by using very small amount of tetramethyl ammonium hydroxide or tetraethyl ammonium hydroxide as the conditioning agent of crystallization thereby being improved the catalytic activity and the selectivity.

(2) The selectivity about the formation of olefin is improved by conditioning the component ratio of SiO$_2$/Al$_2$O$_3$ in the starting zeolite preparation.

(3) The effects about the shortening of the crystallizing period and the improvements of the selectivity and the catalytic life are attained by adding the seed of catalyst to the starting zeolite preparation.

(4) The effects about the increment of the mechanical strength, the improvement of the dimentional stability and the conditioning of the pore structure of catalyst after molding are able to be attained by adding the skelton to the starting zeolite preparation whereby the improvements of the catalytic life and the selectivity about the formation of olefin are obtained.

What is claimed is:

1. A crystalline alumino-silicate ZKU-catalyst, comprising:
a crystallized composition having the following molar ratios:

| SiO$_2$/Al$_2$O$_3$ | 8-70 |
|---|---|
| OH$^-$/SiO$_2$ | 0.2-1.6 |
| H$_2$O/SiO$_2$ | 10-30 |
| M/SiO$_2$ | 0.2-1.7 |
| R/SiO$_2$ | 0.0086-0.20 |
| R/R + M | 0.0005-0.40 |
| K$_2$O/M$_2$O | 0.05-0.3 | wherein R is a conditioning agent comprising a tetraalkyl ammonium cation, the alkyl moieties of which being the same or different and selected from the group consisting of methyl and ethyl;
wherein M is selected from the group consisting of alkali metal ions; and
wherein said composition has an X-ray diffraction pattern as shown in Table I of the specification.

2. A ZKU-catalyst according to claim 1, wherein said composition has the following molar ratios:

| SiO$_2$/Al$_2$O$_3$ | 13-23 |
|---|---|
| OH$^-$/SiO$_2$ | 1.0-0.5 |
| H$_2$O/SiO$_2$ | 10-20 |
| M/SiO$_2$ | 0.5-1.5 |
| R/SiO$_2$ | 0.009-0.015 |
| R/M + R | 0.0005-0.01 |
| K$_2$O/M$_2$O | 0.1-0.2 |

3. A process for making a ZKU-catalyst, comprising:
providing a composition having the following molar ratios:

| SiO$_2$/Al$_2$O$_3$ | 8-70 |
|---|---|
| OH$^-$/SiO$_2$ | 0.2-1.6 |
| H$_2$O/SiO$_2$ | 10-30 |
| M/SiO$_2$ | 0.2-1.7 |
| R/SiO$_2$ | 0.0086-0.20 |
| R/R + M | 0.0005-0.40 |
| K$_2$O/M$_2$O | 0.05-0.3 | heating said composition to a temperature of from about 150° C. to about 270° C.;
maintaining said composition at said temperature for a period of from about 0.5 to about 20 hours and forming a crysallized product thereby;
further processing said crystallized product by filtering, washing and drying; and
calcining said product at a temperature of from about 400° C. to about 600° C. for a period of from about 0.5 to about 5 hrs.;
wherein R is a conditioning agent comprising a tetraalkyl ammonium cation, the alkyl moieties of which being the same or different and selected from the group consisting of methyl and ethyl;
wherein M is selected from the group consisting of alkali metal ions; and
wherein said crystallized product has X-ray diffraction pattern as shown in Table I of the specification.

4. A process for making a ZKU-catalyst, comprising:
providing a composition having the following molar ratios:

| SiO$_2$/Al$_2$O$_3$ | 8-70 |
|---|---|
| OH$^-$/SiO$_2$ | 0.2-1.6 |
| H$_2$O/SiO$_2$ | 10-30 |
| M/SiO$_2$ | 0.2-1.7 |
| R/SiO$_2$ | 0.0086-0.20 |
| R/R + M | 0.0005-0.40 |
| K$_2$O/M$_2$O | 0.05-0.3 | mixing said composition with a quantity of seed crystals of the same said composition or with a combination of said seed crystals and a quantity of a crystal skeleton;
heating the mixture to a temperature of from about 150° C. to about 270° C.;

maintaining said mixture at said temperature for a period of from about 0.5 to about 20 hrs. and forming a crystallized product thereby;

further processing said crystallized product by filtering, washing and drying; and calcining said product at a temperature of from about 400° C. to about 600° C. for a period of from about 0.5 to about 5 hrs.; wherein R is a conditioning agent comprising a tetraalkyl ammonium cation, the alkyl moieties of which being the same or different and selected from the group consisting of methyl and ethyl;

wherein M is selected from the group consisting of alkali metal ions; and wherein said crystal skeleton is selected from the group consisting of $\alpha$-alumina powders, kaoline powders, zeolite powders, porcelain powders and combinations thereof.

5. A process according to claim 4, wherein the particle size of said seed crystals is from about 0.5 to about 1 micron and wherein the quantity of said seed crystals or said combination is from about 0.45 wt. percent to about 20 wt. percent of the weight of said composition.

* * * * *